United States Patent [19]

Zenglein

[11] Patent Number: 4,789,182
[45] Date of Patent: Dec. 6, 1988

[54] DEVICE FOR PIVOTING A RIGID AXLE DRIVEN BY A UNIVERSAL SHAFT TO THE FRAME OF AN AUTOMOTIVE VEHICLE

[75] Inventor: Egon Zenglein, Butzback, Fed. Rep. of Germany

[73] Assignee: O&K Orenstein & Koppel Aktiengesellschaft, Dortmund, Fed. Rep. of Germany

[21] Appl. No.: 156,276

[22] Filed: Feb. 16, 1988

[30] Foreign Application Priority Data

Feb. 20, 1987 [DE] Fed. Rep. of Germany ....... 3705417

[51] Int. Cl.$^4$ ............................................. B60G 11/14
[52] U.S. Cl. ..................................... 280/725; 280/670
[58] Field of Search ............... 280/670, 685, 688, 724, 280/725

[56] References Cited

U.S. PATENT DOCUMENTS

| | | | |
|---|---|---|---|
| 2,746,766 | 5/1956 | Nallinger | 280/725 |
| 2,955,842 | 10/1960 | Stump | 280/724 |
| 4,415,179 | 11/1983 | Morinelli | 280/713 |

FOREIGN PATENT DOCUMENTS

| | | | |
|---|---|---|---|
| 888810 | 8/1956 | Fed. Rep. of Germany. | |
| 997430 | 1/1952 | France | 280/724 |
| 610518 | 10/1948 | United Kingdom | 280/688 |

OTHER PUBLICATIONS

"World Construction", Sep. 1985, advertising section.

Primary Examiner—David M. Mitchell
Assistant Examiner—Ross Weaver
Attorney, Agent, or Firm—Martin A. Farber

[57] ABSTRACT

A device for pivoting a rigid axle driven by a universal shaft to the frame of an automotive vehicle by means of linkage elements one end of each of which has a frame-side support on an imaginary transverse axis which is common to all supports and perpendicular to the longitudinal axis of the vehicle and in connection with which the transverse axis intersects the universal shaft perpendicularly at the midway point between the universal joints of the transmission shaft and the rigid axle. The rigid axle is connected by spring elements to the supported part of the vehicle. Four links are provided, two of which, one individual link 1 and 2, on each side of the vehicle are pivoted in the region close to the wheel at their other end to the axle housing 11 of the rigid axle. The two other link elements, triangle links 3 and 4, form a triangle link with the transverse axis 9 as base, extend with their other ends to a common spherical support point 12 on the axle housing 11 in the region of the longitudinal axis 10 of the automotive vehicle.

9 Claims, 4 Drawing Sheets

DEVICE FOR PIVOTING A RIGID AXLE DRIVEN BY A UNIVERSAL SHAFT TO THE FRAME OF AN AUTOMOTIVE VEHICLE

FIELD AND BACKGROUND OF THE INVENTION

This invention relates to a device for pivoting a rigid axle driven by a universal shaft to the frame of an automotive vehicle by means of linkage elements one end of each of which has a frame-side support on an imaginary transverse axis which is common to all supports and perpendicular to the longitudinal axis of the vehicle, and in connection with which the transverse axis intersects the universal shaft perpendicularly at the midpoint between the universal joints of the transmission and the rigid axle and in which the rigid axle is connected by spring elements to the supported part of the vehicle.

A device is already known for pivoting a rigid axle driven by a universal shaft on the frame of an automotive vehicle by means of linkage elements in which a rigid U-shaped axle bearing pedestal is mounted via its two arms on the frame of the vehicle, the two supporting points lying on the common imaginary transverse axis perpendicular to the longitudinal axis of the vehicle ("World Construction," September 1985, advertising section).

The disadvantage of such a hinge-like suspension is that the rigid axle of the automotive vehicle cannot carry out any oscillating movements. The results are unilateral blows on the vehicle from the axle which cause a rotation around the longitudinal axis of the vehicle. In this way those parts of the vehicle which are as a rule located high up, for instance the driver's cab, experience undesired transverse accelerations which are disagreeably felt by the operating personnel as a physiological load on their bone structure, particularly of the pelvis.

SUMMARY OF THE INVENTION

It is an object of the invention to provide a rigid axle pivoting to the frame of the automotive vehicle by means of link elements which also permit oscillating movements of the shaft and which furthermore provide assurance that while maintaining possibilities of perpendicular movement, possibly extending over a circular arc, of the rigid axle, transverse forces acting on it, longitudinal forces acting in the longitudinal direction of the automotive vehicle, and finally, also, axial moments occurring upon accelerations of the automotive vehicle are transmitted to the frame of the vehicle. In particular, the smallest possible distance between the rigid axle and the vehicle transmission, bridged over by the drive universal shaft, is also to be obtained.

According to the invention, four links are provided, two of which, one individual link (1 and 2) on each side of the vehicle, are pivoted in the region close to the wheel at respective ends of the axle housing (11) of the rigid axle; and wherein the two other linkage elements are triangle links (3 and 4) with the transverse axis (9) as base forming a triangle link, two links being directed from the base to a common spherical support point (12) on the axle housing (11) in the region of the longitudinal axis (10) of the vehicle.

The advantage of the invention is that a rigid axle driven in this manner can also carry out oscillating movements which are followed then, only delayed in accordance with the inertia of the participating masses, in damped manner by the vehicle parts supported by the rigid axle, possibly via spring elements. In addition to this, a small overall installation length of the pivoting device can be obtained with the pivoting disclosed. In this way, the distance between the vehicle transmission and the rigid axle can be made the shortest possible. The universal shaft which bridges over it and drives the rigid axle can be made extremely short, as a result of which only slight changes in length result upon axial movements for these small angles of deflection. The universal shaft in this case carries out a so-called W-movement.

One decisive advantage of the device described above which has a short distance between the front axle and the power divider can be noted, in particular, for the front axle drive of bent-frame-pivoted heavy construction vehicles since in this way a contribution to an increase in the stability is observed when traveling around curves.

According to a feature of the invention, the rigid axle is oscillatingly movable around the spherical support point (12).

According to another feature of the invention, the two side links (1 and 2) are supported approximately at the height of a horizontal plane through the axle center line (16) on the axle housing (11).

Further, the invention provides that on the axle housing (11) separate support devices (21 and 22) are provided to receive the side link end supports.

Still further according to the invention, horizontal planes through the spherical support point (12) and through the individual side link supports on the axle housing (11) are at a distance from each other.

By a further feature of the invention, said distance is made as large as possible, approximately equal to the perpendicular distance between the horizontal plane through the axle center line (16) and the outermost upper axle housing point in the region of the longitudinal axis (10) of the vehicle.

Yet further, the device has an axial-centered differential gearing, characterized by the fact that the spherical support (12) is arranged on the differential gearing housing.

Another feature is that the frame-side supports (6 and 7) of the triangle links (3 and 4) are provided between the supports (5) and (8) of the individual links (1 and 2).

Also the invention provides that the rigid axle is represented by the front axle of a bent-frame-pivoted dump-type construction vehicle.

BRIEF DESCRIPTION OF THE DRAWING

With the above and other objects and advantages in view, the present invention will become more clearly understood in connection with the detailed description of a preferred embodiment when considered with the accompanying drawings, of which.

DETAILED DESCRIPTION OF THE PREFERRED EMBODIMENT

Figure 1:
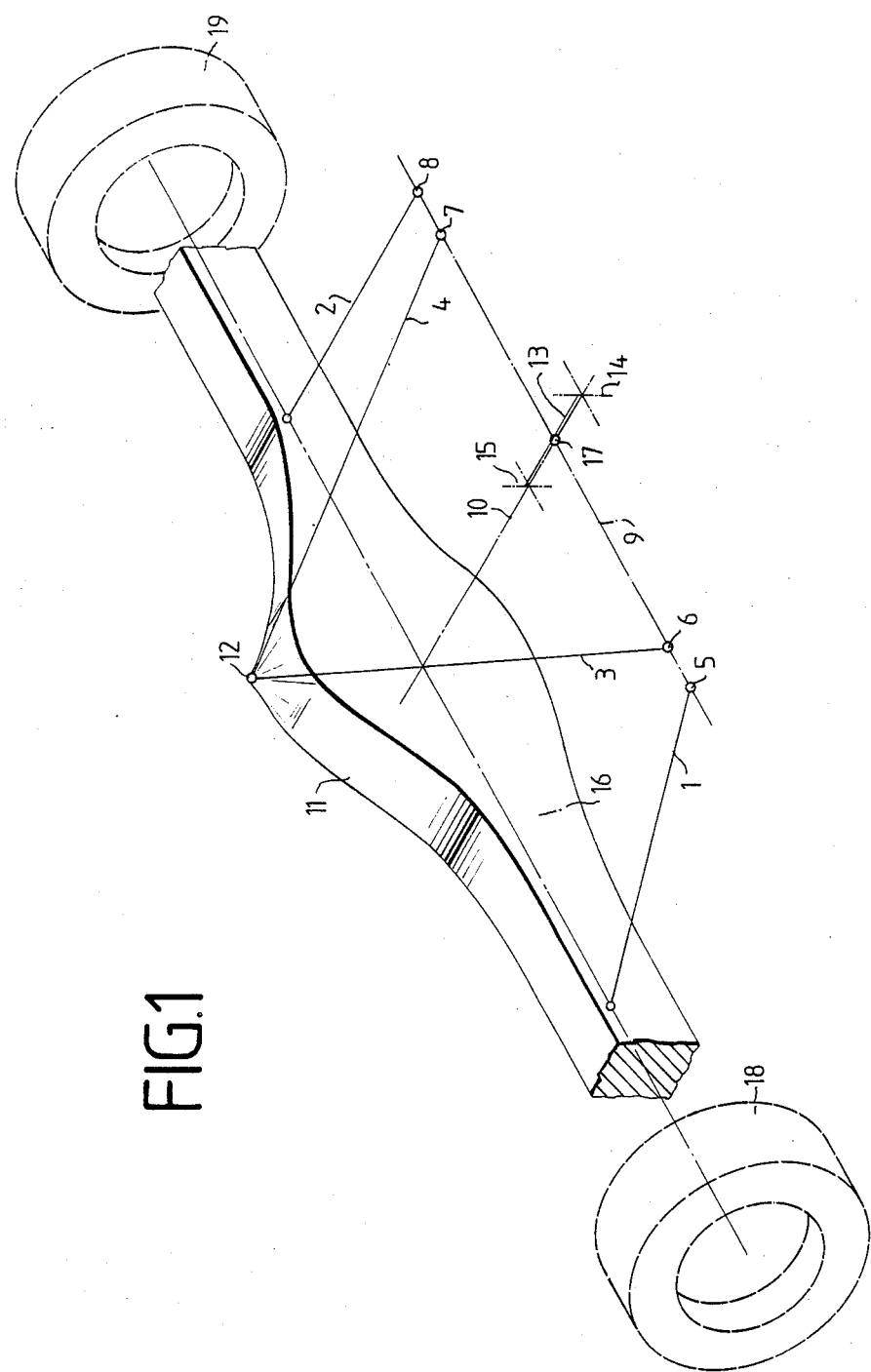
FIG. 1 is a symbolic, abstracted representation in perspective view, partly broken away.

FIG. 1 shows the arrangement in space of the four linkage elements provided. Ends of the individual side links 1 and 2 and of the triangle links 3 and 4 are arranged on the frame side in supports 5, 6, 7 and 8 on a common imaginary transverse axis 9 perpendicular to the longitudinal axis 10 of the vehicle. At their other ends the linkage elements are guided on the axle housing 11, the side links 1 and 2 being in the region close to the wheel, approximately perpendicular to and in a level plane of the axle center line 16. The two other linkage elements which form a triangle link with the transverse axis 9 as base have their other ends brought together at a common spherical support point 12 on the axle housing 11 of the rigid axle. As shown in the drawing, the latter lies within the region of the longitudinal center axis of the vehicle as far as possible above the axle pivot points of the individual links 1 and 2. The rigid axle is oscillatable around it.

The transverse axis 9 intersects the universal shaft 13 perpendicularly, approximately halfway between the universal joints 14 and 15 of the transmission, and the rigid axle in the crossing region 17.

In accordance with the showing of FIG. 1, it can be seen that the horizontal planes on the one hand through the spherical support point 12 and, on the other hand, through the pivot points of the individual links 1 and 2 on the axle housing, are spaced apart from each other. This distance is selected as large as possible by means of the greatest possible vertical distance of the spherical support point 12 above the axle center line 16. In this way the result is obtained that the triangle links 3 and 4 are subjected only to slight load when they have to take up moments of force of the rigid axle. If the rigid axle, as is generally the case, has a differential housing then the spherical support point 12 will be provided on one of the extreme points of the differential housing, preferably on the upper one. From FIG. 1 it can already be noted that a lateral projection in the direction of the axle center line 16 onto a vertical plane in the longitudinal axis 10 of the vehicle projects the side link 1 and the triangle link 3 as a triangle, a side of which which can be noted opposite the acute angle on the transverse axis 9 provides capability as to the best possible transfer of moments of force by the triangle links 3 and 4. The contours described are shown directly in a later figure.

For the orientation in space of the observer, vehicle wheels 18 and 19 have been indicated on the left and right of the axle housing 11.

Figure 2:
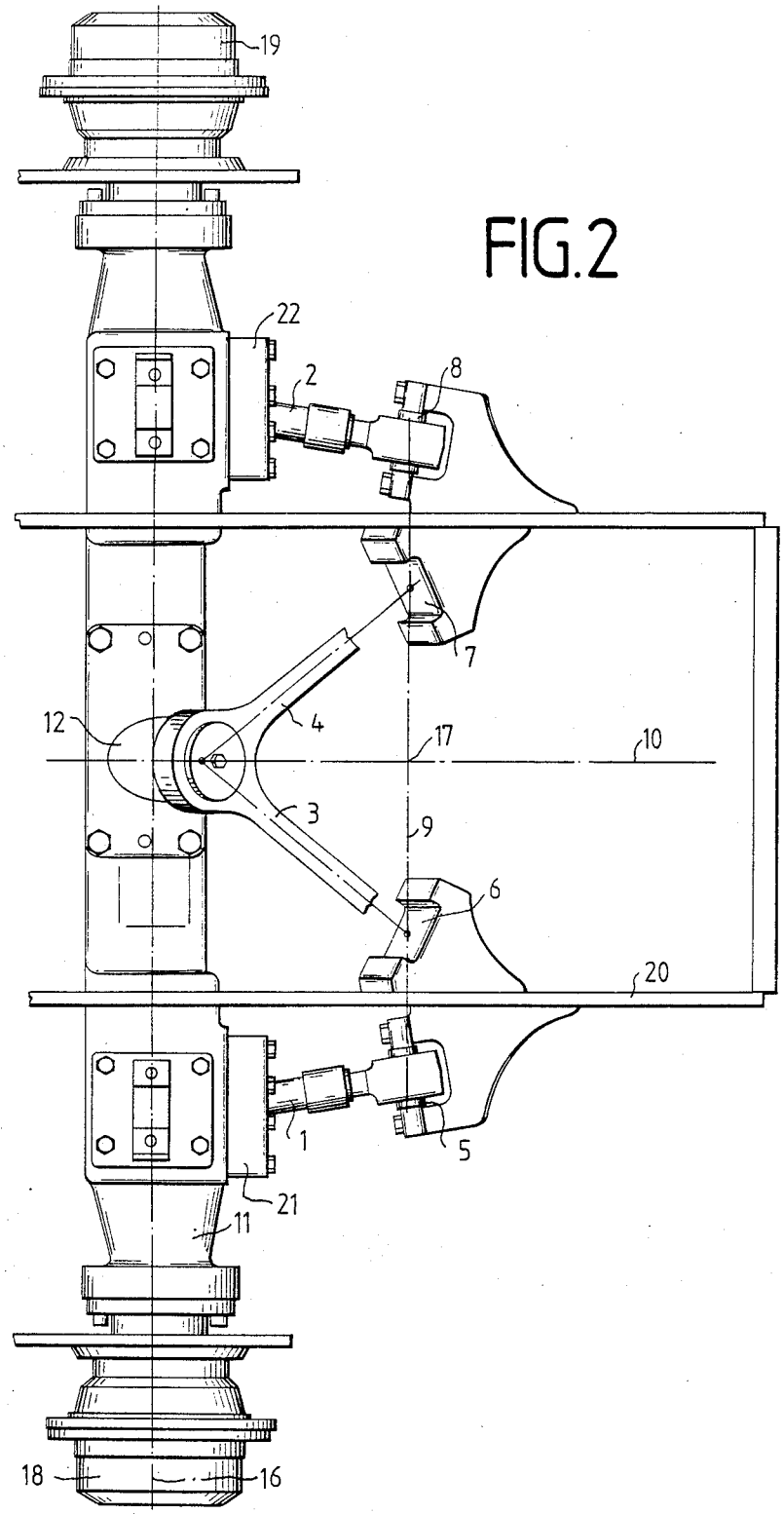
FIGS. 2 and 3 are plan and side views, respectively, of the device for the pivoting of a rigid axle to the frame of a vehicle, FIG. 3 being sectioned through an axle.
Figure 3:
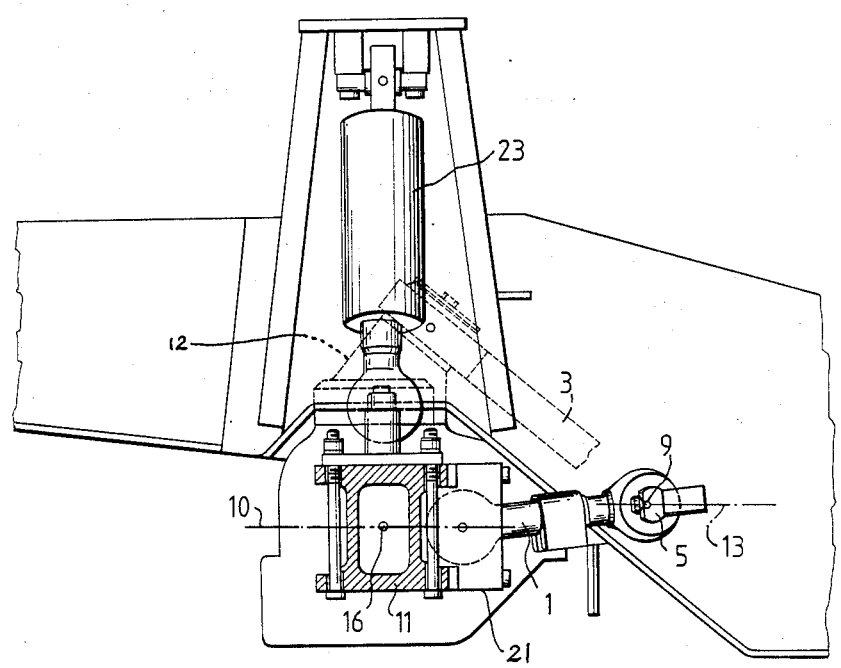

FIGS. 2 and 3 show, in plan and side views, a practical embodiment of the device for the pivoting of a rigid axle to the frame of an automotive vehicle.

The vehicle frame is designated 20. Separate support devices 21 and 22 are pivoted to the axle housing 11 to receive the individual link end supports. From this showing also it is clear that the supports 5, 6, 7 and 8 lie on a line of the imaginary transverse axis 9. A spring element 23 is illustrated.

The side view of FIG. 3 furthermore shows that the individual link 1, in the same way as the individual link 2, is guided from the transverse axis 9 in the direction of the level of the axle center line 16 to the axle housing 11.

Figure 4:
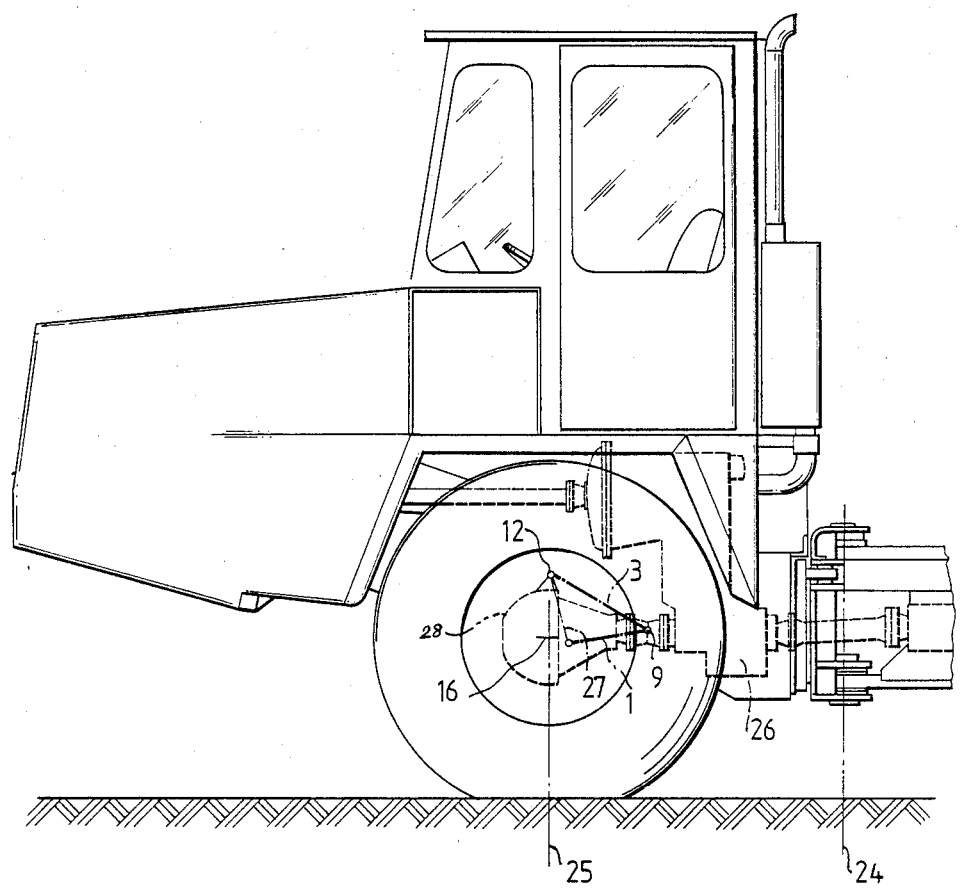
FIG. 4 is a side elevational view of a vehicle, partly broken away, showing one example of use.

FIG. 4 shows, in side view, the use of the rigid axle as front axle of a bent-frame-pivoted dump-type construction vehicle. The decisive contribution for assuring the stability of the vehicle can be obtained by a minimizing of the distance between the bent-pivoted axle 24 and the vertical line 25 through the axle center line 16. A prerequisite for this is also a minimizing of the distance between the transmission 26 and the axle center line 16, for which the device according to the invention offers a solution.

The triangle already mentioned, consisting of the side link 1, the triangle link 3, both extending from the transverse axis 9, with the connection 27 as third side as seen in projection may be taken up once again insofar as, by the showing in this figure, it can easily be noted that moments of force acting on the rigid axle can be taken up all the easier by the triangle links 3 and 4 the greater the perpendicular distance from the pivot point of the individual link 1 on the axle housing 11 to the spherical support point 12.

The transverse forces acting on the rigid axle are transmitted predominantly also by the triangle links 3 and 4 to the frame while the longitudinal forces are taken up and conducted away by the individual links 1 and 2.

Finally, this figure shows, for the case of the use of the rigid axle of the invention as driven front axle of a construction vehicle, that with a built-in oscillation axis the driver of the vehicle who is seated high above it is substantially relieved of transverse accelerations. Differential gearing is located on the longitudinal axis 10 (FIGS. 1 and 2) and enclosed within a housing 28 (FIG. 4). The transmission 26 connects an engine of the vehicle with the universal shaft.

I claim:

1. A device for pivoting a rigid axle, driven by a universal shaft between universal joints of a transmission, to the frame of an automotive vehicle, the device comprising a plurality of linkage elements;

a plurality of frame-side supports on an imaginary transverse axis which is common to all supports and perpendicular to a longitudinal axis of the vehicle, said frame-side supports connecting with respective ones of said linkage elements, the vehicle including spring elements, a housing of said axle and wheels at opposite ends of the housing; and wherein the transverse axis intersects the universal shaft perpendicularly at the midpoint between the universal joints of the transmission and the rigid axle, the rigid axle being connected by the spring elements to a supported part of the vehicle;

said linkage elements comprising four links, two of said links being side links mounted on respective sides of the vehicle and being pivoted to the axle housing in regions close to the wheels, two other ones of said four links being triangle links intersecting with the transverse axis as base forming a part of a triangle; and wherein said device further comprises a common spherical support point on the axle housing in the region of the longitudinal axis of the vehicle, the two triangle links extending to the common support.

2. A device according to claim 1, wherein the rigid axle is oscillatingly movable around the spherical support point.

3. A device according to claim 1, wherein the two side links are supported on the axle housing approximately at the height of a horizontal plane through a center line of the rigid axle.

4. A device according to claim 3, wherein on the axle housing, separate supports are provided to receive ends of the side links.

5. A device according to claim 4, wherein a first horizontal plane passing through the spherical support point and a second horizontal plane passing through the individual supports on the axle housing are at a distance from each other.

6. A device according to claim 5, wherein said distance is made as large as possible, approximately equal to the perpendicular distance between the second horizontal plane and the outermost upper point of the axle housing in the region of the longitudinal axis of the vehicle.

7. A device according to claim 5, wherein the vehicle includes an axial-centered differential gearing; and wherein the spherical support is located on a housing of the differential gearing.

8. A device according to claim 1, wherein two of said frame-side supports hold ends of the triangle links, and another two of said frame-side supports hold ends of the side links; and wherein the frame-side supports of the triangle links are arranged between the frame-side supports of the side links.

9. A device according to claim 1, wherein the rigid axle is the front axle of the vehicle, the vehicle being a bent-frame-pivoted dump-type construction vehicle.

* * * * *